Patented Jan. 19, 1937

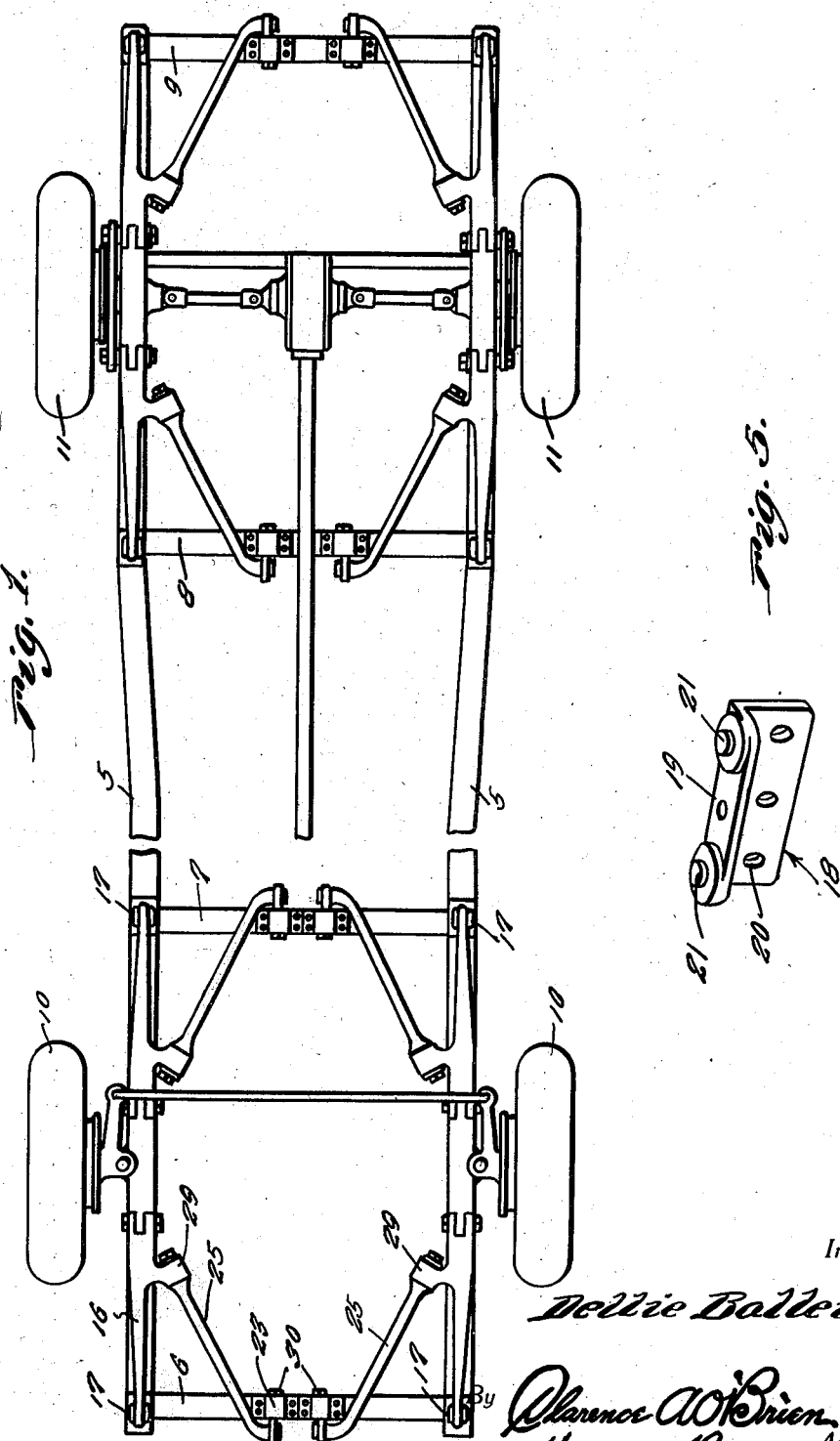

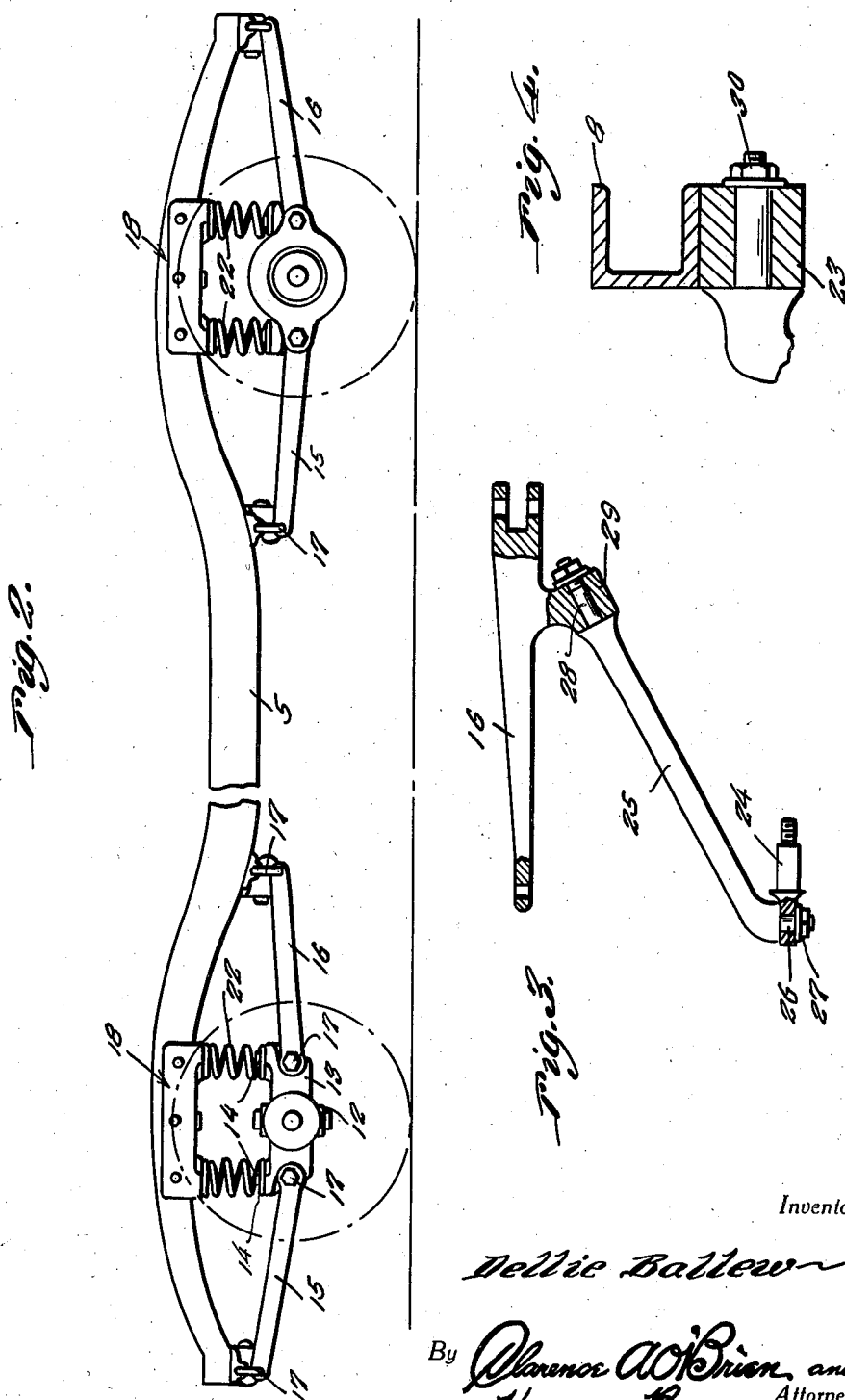

2,068,049

UNITED STATES PATENT OFFICE 2,068,049

VEHICLE SPRING

Dellie Ballew, Detroit, Mich.

Application March 27, 1936, Serial No. 71,225

1 Claim. (Cl. 267—20)

This invention appertains to new and useful improvements in shock absorbing springs for land vehicles.

The principal object of the present invention is to provide a spring structure for wheeled land vehicles which will be more efficient in operation than the present day types now in general use.

Another important object of the invention is to provide a shock absorbing spring structure for land vehicles which in use will be in the nature of the conventional knee-action now found in general use.

These and various other important objects and advantages of the invention will become apparent to the reader of the following specification.

In the drawings:—

Figure 1 represents a bottom plan view of an automobile chassis with the spring means installed thereon.

Figure 2 represents a side elevational view of an automobile chassis showing the spring means installed.

Figure 3 is a side elevational view showing one of the levers and associate arm with parts shown partly in section.

Figure 4 is a fragmentary detailed sectional view.

Figure 5 is a perspective view of the chassis attaching plate.

Referring to the drawings wherein like numerals designate like parts, it can be seen, in Figure 1, that numerals 5—5 represent the side rails of the vehicle chassis connected by the front cross members 6—7 and the rear cross members 8—9. The numerals 10—10 represent the front wheels while numerals 11—11 represent the rear wheels.

The front wheels have their stub shaft knuckles 12 mounted on horizontal plates 13 which are provided with upstanding studs 14—14 on the upper edges thereof. The forward and rearward extending arms 15—16 are pivotally connected at their adjacent ends as at 17 to the forward end and rearward ends of the said plate 13. The remaining ends of the arm 16 are connected by shackles 17 to the chassis bars 5. The rear spring assemblies are constructed in like manner as suggested in Figure 1.

Secured to the outside at the forward and rearward end portions of each side bar 5 is the plate generally referred to by numeral 18, each of which is in complement with a corresponding plate 13. The plate 18 is shown inverted in Figure 5 to show the flange 19 extending along one longitudinal edge thereof. The plate 18 is provided with openings 20 whereby it can be riveted through the chassis rail 5 and on the bottom side of the flange 19 are the studs 21 which are opposite the studs 14 on the corresponding plates 13. Coiled compressible springs 22 are interposed between the plates 13—18 with the end convolutions circumscribing the said studs 14—21.

On the cross members 6, 7, 8 and 9 are the bearings 23 through which the eye bolts 24 of the arms 25 are journaled. Each of these arms 25 has at one end a pin 26 for disposition through the eye of the corresponding eye bolt 24 and a suitable nut 27 thereon while the opposite end is provided with a pintle 28 for disposition through the obliquely disposed bore in the stub 29 on the inside of the corresponding lever 16. The pintle 28 disposed through the stub formation 29 provided with a nut as is the eye bolt 24 equipped with a nut 30 as clearly shown in Figure 1.

It can now be seen, that as a wheel of the vehicle passes over an obstruction, the spring 22 on the advanced side of the wheel will compress rocking the plate 13 until the wheels start to pass over and at this point both levers 15—16 of the particular wheel swing upwardly without any appreciable elevation of the corresponding chassis bar 5 and as the wheel rides off of the obstruction the rear lever 16 will gradually let down the spring assembly. The arms 25 serve to stabilize the spring assembly during this independent action of the spring assembly with respect to the chassis.

While the foregoing specification sets forth the invention in specific terms, it is to be understood that numerous changes in the shape, size and material may be resorted to without departing from the spirit and scope of the invention as claimed hereinafter.

Having described the invention what is claimed as new is:—

In combination with land vehicle chassis frame including side rails, axles, wheels on the said axles, each of said axles being provided with horizontally extending plates, a forward and a rearward lever for each of the wheels, each of said levers being connected at one of its ends to one end of the corresponding horizontal plate, the remaining ends of the levers being pivotally connected to the side bars of the chassis frame and coiled springs interposed between the side bars of the chassis frame and said horizontal plates, said chassis bars being provided with cross bars, arm members pivotally connected each at one end to one of the levers the remaining ends of said arm members, being provided with an eye member, pivotal connections between the arm members and the eye members, said eye members being provided with smooth shanks journaled into corresponding cross bars.

DELLIE BALLEW.